(12) United States Patent
Bell

(10) Patent No.: US 12,183,940 B2
(45) Date of Patent: Dec. 31, 2024

(54) UNMANNED AERIAL VEHICLE (UAV) LANDING SYSTEMS

(71) Applicant: United Parcel Service of America, Inc., Atlanta, GA (US)

(72) Inventor: Julian Bell, Decatur, GA (US)

(73) Assignee: United Parcel Service Of America, Inc., Atlanta, GA (US)

( * ) Notice: Subject to any disclaimer, the term of this patent is extended or adjusted under 35 U.S.C. 154(b) by 0 days.

(21) Appl. No.: 17/821,980

(22) Filed: Aug. 24, 2022

(65) Prior Publication Data

US 2023/0063715 A1 Mar. 2, 2023

Related U.S. Application Data

(60) Provisional application No. 63/237,392, filed on Aug. 26, 2021.

(51) Int. Cl.
*B64U 70/00* (2023.01)
*B60H 1/00* (2006.01)
(Continued)

(52) U.S. Cl.
CPC ...... *H01M 50/269* (2021.01); *B60H 1/00264* (2013.01); *B60L 53/80* (2019.02);
(Continued)

(58) Field of Classification Search
CPC ......... B64U 70/97; B64U 70/99; B64U 70/92
See application file for complete search history.

(56) References Cited

U.S. PATENT DOCUMENTS

| 720,395 A | 2/1903 | Ash et al. |
| 3,948,466 A | 4/1976 | Rudder et al. |

(Continued)

FOREIGN PATENT DOCUMENTS

| CH | 508541 A | 6/1971 |
| CN | 102785937 A | 11/2012 |

(Continued)

OTHER PUBLICATIONS

International Preliminary Report on Patentability received for PCT Patent Application No. PCT/US2022/023688, mailed on Oct. 19, 2023, 11 pages.

(Continued)

*Primary Examiner* — Christopher P Ellis
(74) *Attorney, Agent, or Firm* — Shook, Hardy & Bacon L.L.P.

(57) ABSTRACT

A landing system suitable for receiving an unmanned aerial vehicle (UAV) comprises an autonomous ground vehicle (AGV). A landing surface is disposed on the AGV, and the landing system comprises a loading channel suitable for passing an object delivered by the UAV through a first loading channel opening in the landing surface. The object passes within the loading channel through to a second loading channel opening at a bottom aspect of the AGV. In this way, a UAV can land on the landing surface, and the AGV positions the object in line with a target delivery location, where the object is delivered. Aspects of the landing system comprise an electromagnet or vacuum chamber for securing the UAV to the landing surface, thereby enhancing stability of the UAV during movement of the landing system.

15 Claims, 6 Drawing Sheets

(51) Int. Cl.
*B60L 53/80* (2019.01)
*B64C 39/02* (2023.01)
*B64D 9/00* (2006.01)
*B64F 1/02* (2006.01)
*F25B 21/02* (2006.01)
*F25D 11/00* (2006.01)
*G05D 1/00* (2006.01)
*H01M 50/204* (2021.01)
*H01M 50/249* (2021.01)
*H01M 50/264* (2021.01)
*H01M 50/269* (2021.01)
*H01M 50/296* (2021.01)
*B64U 50/19* (2023.01)
*B64U 80/86* (2023.01)
*B64U 101/60* (2023.01)

(52) U.S. Cl.
CPC ............. *B64C 39/024* (2013.01); *B64D 9/00* (2013.01); *B64F 1/02* (2013.01); *F25B 21/02* (2013.01); *F25D 11/003* (2013.01); *G05D 1/0202* (2013.01); *G05D 1/0246* (2013.01); *G05D 1/0684* (2013.01); *G05D 1/101* (2013.01); *H01M 50/204* (2021.01); *H01M 50/249* (2021.01); *H01M 50/264* (2021.01); *H01M 50/296* (2021.01); *B64U 50/19* (2023.01); *B64U 70/00* (2023.01); *B64U 80/86* (2023.01); *B64U 2101/60* (2023.01); *B64U 2201/10* (2023.01); *F25D 2201/14* (2013.01); *H01M 2220/20* (2013.01)

(56) References Cited

U.S. PATENT DOCUMENTS

| | | | |
|---|---|---|---|
| 5,760,569 | A | 6/1998 | Chase, Jr. |
| 5,799,909 | A | 9/1998 | Ziegler |
| 5,868,357 | A | 2/1999 | Gabriel |
| 6,179,357 | B1 | 1/2001 | Gabriel |
| 6,554,151 | B1 | 4/2003 | Brennan |
| 7,631,444 | B1 | 12/2009 | Hursen |
| 7,635,065 | B1 | 12/2009 | Pettinger |
| 9,027,777 | B1 | 5/2015 | Steidinger, III |
| 9,280,038 | B1 | 3/2016 | Pan et al. |
| 9,387,928 | B1* | 7/2016 | Gentry .................. G08G 5/0039 |
| 9,412,280 | B1 | 8/2016 | Zwillinger et al. |
| 9,527,605 | B1* | 12/2016 | Gentry .................... F21S 8/086 |
| 9,650,133 | B2* | 5/2017 | Fisher ..................... B64C 29/02 |
| 9,676,481 | B1 | 6/2017 | Buchmueller |
| 9,688,404 | B1 | 6/2017 | Buchmueller et al. |
| 9,957,048 | B2 | 5/2018 | Gil |
| 9,969,494 | B1 | 5/2018 | Buchmueller et al. |
| 9,981,745 | B2 | 5/2018 | Gil |
| 10,040,370 | B2 | 8/2018 | Wei et al. |
| 10,071,804 | B1 | 9/2018 | Buchmueller et al. |
| 10,246,187 | B2 | 4/2019 | Cantrell et al. |
| 10,274,952 | B2 | 4/2019 | Cantrell et al. |
| 10,435,156 | B2 | 10/2019 | Bellof et al. |
| 10,640,214 | B2 | 5/2020 | Lopez et al. |
| 10,807,714 | B2 | 10/2020 | Atchley et al. |
| 10,836,406 | B2 | 11/2020 | Lum et al. |
| 10,899,449 | B2 | 1/2021 | Luckay et al. |
| 11,187,200 | B1 | 11/2021 | Kolbe et al. |
| 11,225,325 | B1 | 1/2022 | Evans, II |
| 11,345,051 | B2 | 5/2022 | Zheng et al. |
| 11,453,498 | B2 | 9/2022 | Martens |
| 11,667,383 | B2 | 6/2023 | Evans, II |
| 2005/0000967 | A1 | 1/2005 | Najd |
| 2005/0023284 | A1 | 2/2005 | Heiberg et al. |
| 2008/0083756 | A1 | 4/2008 | Daniels |
| 2014/0180914 | A1 | 6/2014 | Abhyanker |
| 2016/0068264 | A1 | 3/2016 | Ganesh et al. |
| 2016/0140851 | A1 | 5/2016 | Levy et al. |
| 2016/0257423 | A1* | 9/2016 | Martin .................... A47G 29/14 |
| 2017/0015415 | A1 | 1/2017 | Chan et al. |
| 2017/0021923 | A1* | 1/2017 | Fisher ....................... B64F 1/12 |
| 2017/0029101 | A1 | 2/2017 | Weissenberg |
| 2017/0038116 | A1 | 2/2017 | Ros |
| 2017/0217323 | A1* | 8/2017 | Antonini ................. B60L 53/30 |
| 2017/0313421 | A1 | 11/2017 | Gil |
| 2017/0316375 | A1 | 11/2017 | Gil |
| 2017/0349039 | A1 | 12/2017 | Rayner et al. |
| 2017/0368959 | A1 | 12/2017 | Hara et al. |
| 2018/0002015 | A1 | 1/2018 | McCullough et al. |
| 2018/0105063 | A1 | 4/2018 | Wei et al. |
| 2018/0265222 | A1 | 9/2018 | Takagi |
| 2018/0312069 | A1 | 11/2018 | McClymond |
| 2018/0370618 | A1 | 12/2018 | Harris |
| 2019/0144007 | A1 | 5/2019 | Lum et al. |
| 2019/0291865 | A1 | 9/2019 | O'donnell |
| 2020/0047353 | A1 | 2/2020 | Zheng et al. |
| 2021/0197982 | A1* | 7/2021 | Sweeny .................... B60P 3/11 |
| 2021/0229903 | A1 | 7/2021 | Goines, Jr. |
| 2022/0035381 | A1* | 2/2022 | Okuno .................. G05D 1/0858 |
| 2022/0134899 | A1* | 5/2022 | Eide ........................ H02J 50/10 244/115 |
| 2022/0315209 | A1 | 10/2022 | Gil et al. |
| 2022/0315222 | A1 | 10/2022 | Gil et al. |
| 2022/0315246 | A1 | 10/2022 | Gil et al. |
| 2022/0320669 | A1 | 10/2022 | Gil et al. |
| 2023/0008634 | A1* | 1/2023 | Kabakov ................. B64F 1/007 |
| 2023/0060684 | A1 | 3/2023 | Bell |
| 2023/0131957 | A1* | 4/2023 | Lowenberg ............ B64U 70/99 244/137.1 |

FOREIGN PATENT DOCUMENTS

| | | |
|---|---|---|
| CN | 110398983 A | 11/2019 |
| CN | 110963033 A | 4/2020 |
| CN | 112230672 A | 1/2021 |
| CN | 113183824 A | 7/2021 |
| DE | 102017209263 A1 | 12/2018 |
| EP | 1993940 A1 | 11/2008 |
| EP | 2644438 A2 | 10/2013 |
| EP | 2868577 A1 | 5/2015 |
| EP | 3177528 A1 | 6/2017 |
| FR | 2685547 A1 | 6/1993 |
| FR | 3075170 A1 | 6/2019 |
| JP | 53-45890 A | 4/1978 |
| JP | 1-176720 A | 7/1989 |
| JP | 2017-083063 A | 5/2017 |
| JP | 6176309 B2 | 8/2017 |
| KR | 10-1778883 B1 | 9/2017 |
| KR | 10-2019-0069968 A | 6/2019 |
| KR | 10-2021105 B1 | 9/2019 |
| KR | 10-2023-0164329 A | 12/2023 |
| WO | 95/21361 A1 | 8/1995 |
| WO | 2015/061008 A1 | 4/2015 |
| WO | 2015/158394 A1 | 10/2015 |
| WO | 2015/158934 A1 | 10/2015 |
| WO | WO-2016019978 A1* | 2/2016 .......... B60L 11/1816 |
| WO | 2020/184166 A1 | 9/2020 |
| WO | 2020/235744 A1 | 11/2020 |
| WO | 2021/101735 A1 | 5/2021 |

OTHER PUBLICATIONS

International Preliminary Report on Patentability received for PCT Patent Application No. PCT/US2022/023690, mailed on Oct. 19, 2023, 9 pages.

International Preliminary Report on Patentability received for PCT Patent Application No. PCT/US2022/023692, mailed on Oct. 19, 2023, 08 pages.

International Search Report and Written Opinion received for PCT Patent Application No. PCT/US2022/040094, mailed on Dec. 1, 2022, 15 pages.

International Search Report and Written Opinion received for PCT Patent Application No. PCT/US2022/040477, mailed on Nov. 14, 2022, 13 pages.

(56) References Cited

OTHER PUBLICATIONS

International Search Report and Written Opinion received for PCT Patent Application No. PCT/US2022/041701, mailed on Jan. 26, 2023, 15 pages.
International Search Report and Written Opinion received for PCT Patent Application No. PCT/US2022/041727, mailed on Dec. 13, 2022, 20 pages.
Non-Final Office Action received for U.S. Appl. No. 17/818,848, mailed on Jan. 26, 2024, 13 pages.
Invitation to Pay Addition Fees received for PCT Patent Application No. PCT/US2022/041701, mailed on Dec. 5, 2022, 9 pages.
Non-Final Office Action received for U.S. Appl. No. 17/711,730, mailed on Oct. 5, 2023, 10 pages.
International Search Report and Written Opinion received for PCT Patent Application No. PCT/US2022/023688, mailed on Jul. 12, 2022, 16 pages.
International Search Report and Written Opinion received for PCT Patent Application No. PCT/US2022/023690, mailed on Jun. 29, 2022, 14 pages.
International Search Report and Written Opinion received for PCT Patent Application No. PCT/US2022/023692, mailed on Jun. 21, 2022, 5 pages.
International Search Report and Written Opinion received for PCT Patent Application No. PCT/US2022/023994, mailed on Jul. 14, 2022, 13 pages.
Non-Final Office Action received for U.S. Appl. No. 17/711,739, mailed on Sep. 26, 2024, 8 pages.
Notice of Allowance received for U.S. Appl. No. 17/711,730, mailed on Oct. 1, 2024, 9 pages.

* cited by examiner

UNMANNED AERIAL VEHICLE (UAV) LANDING SYSTEMS

CROSS-REFERENCE TO RELATED APPLICATIONS

This Application claims the benefit of priority to U.S. Provisional Application No. 63/237,392, filed on Aug. 26, 2021, entitled "Pneumatic Platform and Payload Containers for Unmanned Aerial Vehicles," the contents of which are expressly incorporated herein by reference in their entirety.

BACKGROUND

Unmanned aerial vehicles (UAVs) are used to deliver packages. In doing so, UAVs pick up packages and release them at delivery locations. Some UAVs release packages during flight by lowering them to the ground. Other UAVs land at the delivery location and release the packages after landing.

SUMMARY

Aspects of the present technology generally relate to landing systems and methods of using the landing systems to facilitate delivery of an object by a UAV.

In one aspect, a landing system includes a landing surface. The landing system also includes a plurality of landing gear receiving sites, where each landing gear receiving site has an opening formed at least partially by the landing surface and a perimeter wall extending away from a perimeter edge of the opening. The perimeter wall extends around a center aspect of the landing gear receiving site. The landing system also includes a lock disposed within each landing gear receiving site, where the lock is movable between a first position and a second position. In the first position, a leading edge of the lock is separated from the center aspect by a first distance, and in the second position, the leading edge of the lock is separated from the center aspect by a second distance. The second distance is greater than the first distance. The lock is biased toward the first position. As such, the lock moves to the second position to allow a landing gear of the UAV to be received by the landing gear receiving site, and is moved to the first position where it mates with a groove of the landing gear, thereby securing the UAV to the landing system.

In another aspect, a landing system includes an autonomous ground vehicle (AGV). A landing surface is disposed on the AGV. The landing system further comprises a loading channel that includes a first loading channel opening formed by the landing surface, and the loading channel extends through to a second loading channel opening at a bottom aspect of the AGV. A UAV is received at the landing surface, and the AGV moves to position an object carried by the UAV to a target delivery location where the object is released by the UAV and passed through the loading channel to the target delivery location. In an aspect, the UAV receives the object for delivery at the target delivery location, where it is passed through the loading channel and secured to the UAV.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1A:
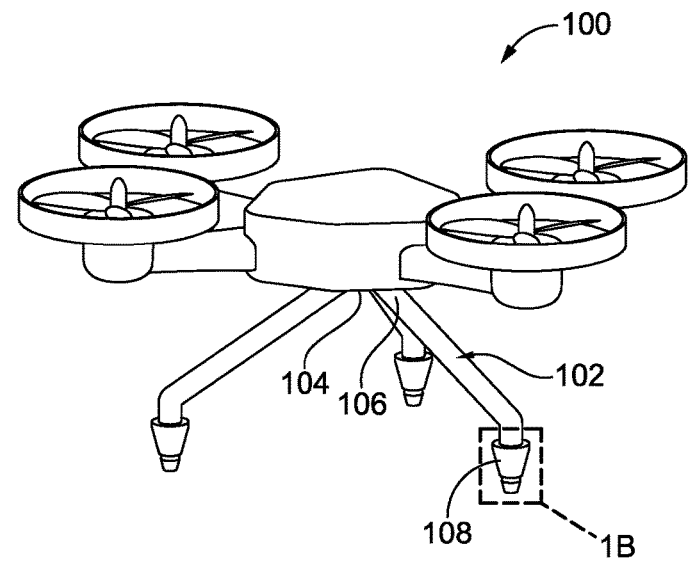
FIGS. 1A-1B illustrate an example UAV having an example landing gear suitable for use with aspects of the present technology, in accordance with an aspect described herein.

The present disclosure generally provides landing systems suitable to facilitate delivery of an object by a UAV to a target delivery location. Such landing systems may further be used to facilitate securing the object to the UAV for delivery by maneuvering to a target delivery location where the object is received by the UAV.

To do so, an embodiment of the technology comprises a landing system that includes a landing surface. The landing system may comprise an autonomous ground vehicle (AGV), on which the landing surface is disposed, thereby providing a mobile landing surface. The landing system also includes a plurality of landing gear receiving sites. A landing gear receiving site may be shaped to correspond to a landing gear of a UAV, in order to facilitate precise placement of the UAV on the landing system and to further stabilize the UAV when the AGV is in motion. In other embodiments, a landing gear may only provide stabilization to the UAV while the AGV is in motion, but not otherwise constrain or relate the two.

The landing gear receiving site includes an opening at the landing surface. That is, the landing surface may form a perimeter edge of the opening. The landing gear receiving site comprises a perimeter wall that extends away from the opening in a shape corresponding to the shape of the landing gear of the UAV. The perimeter edge of the landing gear receiving site can taper inward as it extends away from the opening. In this way, a UAV can insert the landing gear within the opening, and the landing gear comes to a rest in a specific position due to the tapered perimeter wall. The opening to a tapered landing gear receiving site reduces the landing precision demand on the UAV, as it can insert landing gear into the opening over a relatively wider area and come to rest at a precise location suitable for performing other functions, such as releasing or retrieving an object for delivery. This also reduces the likelihood that a UAV will require repositioning after landing to align an object for delivery. As such, the landing gear receiving site helps to accurately and precisely place the UAV in a particular position on the landing surface, which may help to facilitate loading and unloading of objects on the UAV, as will be further described.

Each landing gear receiving site may further include a lock that engages groove of the landing gear to further facilitate stability of the UAV. The lock is movable between a first position and a second position. In an embodiment, the lock is at least partially nested within the perimeter wall and has a leading edge that is closer to a center aspect of the landing gear receiving site in the first position relative to the second position. In this way, the landing gear engages the lock and moves it to the second position as the landing gear is inserted within the landing gear receiving site. The lock then moves back into the first position where it mates with the groove of the landing gear, thereby at least partially securing the landing gear within the landing gear receiving site. To remove the landing gear, the lock is moved back to the second position and out of the landing gear groove. In an aspect, the lock is biased toward the first position with a spring, and the lock may be moved between the first position and the second position by way of an actuator, such as a linear solenoid.

The landing system further comprises a loading channel. The loading channel provides a space where an object can be loaded or unloaded from a UAV at a target delivery location. For instance, the loading channel has a first loading channel opening formed by the landing surface, and the loading channel extends through to a second loading channel opening at a bottom aspect of the AGV. As such, a UAV can be received (e.g., land on) at the landing surface. The AGV moves to position the object carried by the UAV to a target delivery location where the object is released by the UAV and passes through the loading channel to the target delivery location. Moreover, the UAV may be positioned by the AGV to receive an object through the loading channel that is secured to the UAV for delivery.

Another aspect of the technology includes a landing system having an AGV for moving the landing surface. The landing system comprises a loading channel similar to that previously described. The landing system further comprises an electromagnet or vacuum chamber that, when engaged, at least partially secures the UAV to the landing surface.

In any case, the AGV may be used to position the landing system proximate the target delivery location. When doing so, the AGV aligns the object and the target delivery location. As such, even in instances where the object is not positioned along a center aspect of the loading channel, the AGV offsets this positioning by aligning the object with the target delivery location. This may be done using one or more cameras positioned on the AGV or at another location remote from the AGV, including cameras utilized by the UAV.

The aforementioned embodiments have been provided as examples of the technology that may be practiced from the present disclosure. They are intended to be examples and are provided to aid in understanding the technology and its benefits. Additional features and embodiments are further described with reference to the figures.

FIG. 1A is an example UAV 100 that is suitable for use with aspects of the technology. While UAV 100 is illustrated as a four-rotor UAV, the illustration is intended to be one example. It will be understood that there are many UAVs suitable for use with the technology, including those that comprises more or less than four rotors, as shown. Moreover, suitable UAVs may be fully autonomous, semi-autonomous, or fully remote controlled, or any combination thereof over a flight path. Such UAVs may be suitable as UAV 100 or other aspects of UAVs provided herein, such as those later described with reference to FIGS. 6-10.

UAV 100 comprises landing gear, an example of which is designated as landing gear 102. In general, landing gear may comprise a plurality of landing gear, such as the three illustrated with respect to UAV 100. Any number of landing gear may be used in providing support and stability during takeoff and landing. In some cases, landing gear not only supports a UAV during takeoff or landing, but may also serve other functions, such as acting as an object carrier or any other useful function. While the landing gear in FIG. 1A is shown as disposed on a lower aspect of a fuselage UAV 100, there may be cases where suitable landing gear is coupled to another aspect of a UAV, and it may extend in any direction. For instance, the landing gear that will be discussed with respect to UAV 100 is suitable for being secured into a landing gear receiving site, thereby docking UAV 100. It is contemplated that landing gear receiving sites may be positioned at locations other than a flat, horizontal surface, such as the side of, or even below, a structure. As such, landing gear may be located at any position of the UAV suitable for docking the UAV, via the landing gear, to the landing gear receiving site. As such, "landing gear" should be interpreted broadly.

With this in mind, and with continued reference to FIG. 1A, landing gear 102 is coupled to bottom aspect 104 of UAV 100. Landing gear 102 is coupled to bottom aspect 104 at first landing gear end 106 and extends therefrom to second landing gear end 108.

Figure 1B:
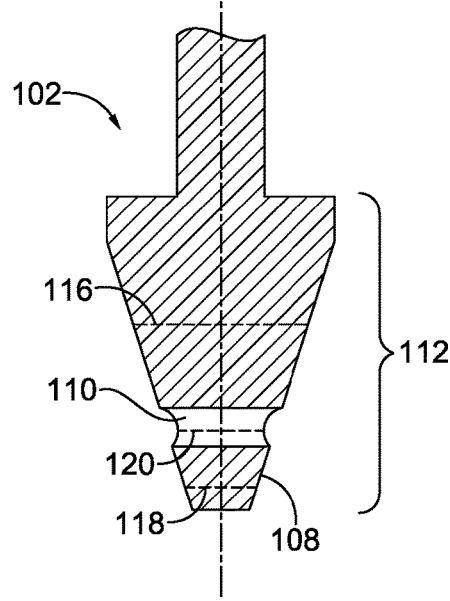

FIG. 1B is an expanded view of a portion of landing gear 102 at second landing gear end 108. Second landing gear end 108 provides one example of landing gear that is suitable for use with aspects of the technology, including suitable for engaging some landing gear receiving sites. It should be understood that FIG. 1B is intended to illustrate one example shape that corresponds to a particular landing gear receiving site, such as those further described herein, but that other landing gear may have a different shape so as to other landing gear receiving sites in manners that will be further described.

In this particular example, second landing gear end 108 comprises groove 110. Groove 110 generally facilitates locking landing gear 102 within a lock of a landing gear receiving site. Here, groove 110 is provided as a recessed area that fully extends around an axis of landing gear 102, illustrated using dotted line 114. In aspects, groove 110 extends only partially around dotted line 114, for instance, comprising a recessed indentation within landing gear 102 proximate second landing gear end 108.

Landing gear 102 further comprises conical portion 112 proximate second landing gear end 108. As will be described, conical portion 112 is a shape corresponding to a portion of a landing gear receiving site. Conical portion 112 comprises a portion of landing gear 102 that tapers in a direction from first landing gear end 106 toward second landing gear end 108. For instance, conical portion 112 may comprise first cross section 116 that has a width greater than a width of second cross section 118, where first cross section 116 is closer to first landing gear end 106 relative to second cross section 118. As will be described, conical portion 112 helps facilitate positioning of UAV 100 by aligning landing gear 102 at a particular position within a landing gear receiving site.

Continuing with FIG. 1B, groove 110 is disposed at a location on conical portion 112. As noted, groove 110 may be a recessed area that at least partially extends around landing gear 102. Thus, third cross section 120 of landing gear 102 may be taken at groove 110, and third cross section 120 is less than at least one cross section of landing gear 102 taken at a location closer to second landing gear end 108, such as second cross section 118. In a particular case, in order to help facilitate locking, conical portion 112 comprises first cross section 116 that has a width greater than second cross section 118, and third cross section 120 at groove 110 has a width less than both first cross section 116 and second cross section 118.

Figure 2:
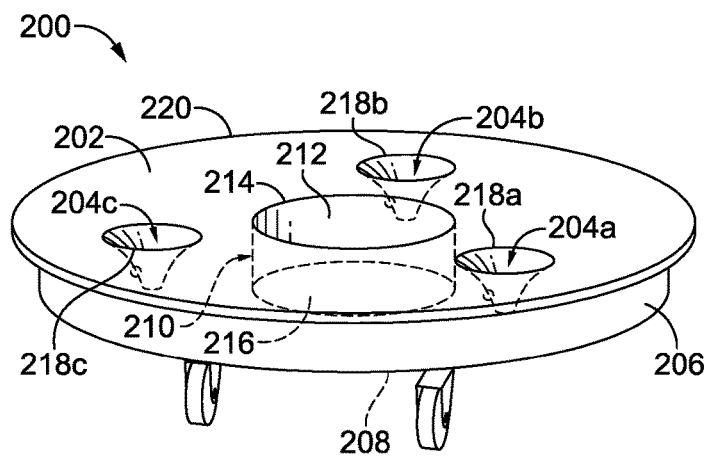
FIG. 2 is an example landing system, in accordance with an aspect described herein.

Turning now to FIG. 2, example landing system 200 is illustrated and is suitable for use with aspects of the technology describe herein, such as those described with with reference to FIGS. 1A-1B. Landing system 200 comprises a landing surface 202, which is generally suitable for receiving a UAV, such as UAV 100. For instance, landing surface 202 provides a location at which a UAV may land or from which a UAV may takeoff.

Landing system 200 further comprises one or more landing gear receiving sites. In the example illustrated, landing system 200 comprises three landing gear receiving sites 204a-204c. However, it will be understood that aspects of the technology may comprise one or more landing gear receiving sites, and that the landing gear receiving sites may be arranged on a landing surface in a manner such that the arrangement corresponds with an arrangement of landing gear on a UAV. Additionally, landing gear receiving sites may take many different forms, including but not limited to the geometry depicted in FIG. 2.

Each landing gear receiving site 204a-204c may comprise an opening. Openings may be located at landing surface 202. As an example, openings may be defined by perimeter edges 218a-218c. A UAV, such as UAV 100, may navigate to landing system 200 and utilize the openings provided thereon to engage landing gear with landing gear receiving sites. In this way, a UAV can position landing gear anywhere within the opening, reducing the demand for precise navigation by the UAV, as will be further described. Additional details regarding landing gear receiving sites, such as landing gear receiving sites 204a-204c, suitable for use with landing system 200 will be discussed with reference to FIGS. 3-5.

Landing system 200 may further comprise AGV 206, on which landing surface 202 is disposed. AGV 206 comprises a bottom aspect 208 that is opposite landing surface 202. Generally, AGV 206 is intended to represent any autonomous or semi-autonomous vehicle. Suitable AGV systems are generally known to those of ordinary skill in the art. While AGV 206 is illustrated as a wheel-based vehicle, other movement mechanisms are also contemplated as suitable, including track systems, rail-based movement systems, and so forth. AGV 206 may be autonomously guided through machine learned models, operate under preprogrammed movement instructions, be at least partially guided by a remote controller, or the like, or any combination thereof to facilitate movement of landing system 200.

With continued reference to FIG. 2, landing system 200 further comprises loading channel 210. In general, loading channel 210 helps facilitate loading and unloading of objects carried by a UAV, such as UAV 100. Loading channel 210 comprises first loading channel opening 212 that opens at landing surface 202. For instance, first loading channel opening 212 may be defined by perimeter edge 214 that is at least partially formed by landing surface 202. In some cases, perimeter edge 214 may be formed entirely by landing surface 202. In an implementation, landing surface 202 extends between first loading channel opening 212 and outer landing surface edge 220 that defines at least a portion of an outer perimeter of landing surface 202. In such cases, openings of landing gear receiving sites 204a-204c may be disposed between first loading channel opening 212 and outer landing surface edge 220.

Loading channel 210 extends from first loading channel opening 212 through AGV 206 to second loading channel opening 216 at bottom aspect 208. This arrangement allows objects to be released by UAVs at landing surface 202 and passed through loading channel 210 below landing system 200. When loading, an object can be passed upward through loading channel 210 and secured to a UAV 100 at landing surface 202.

Figure 3A:
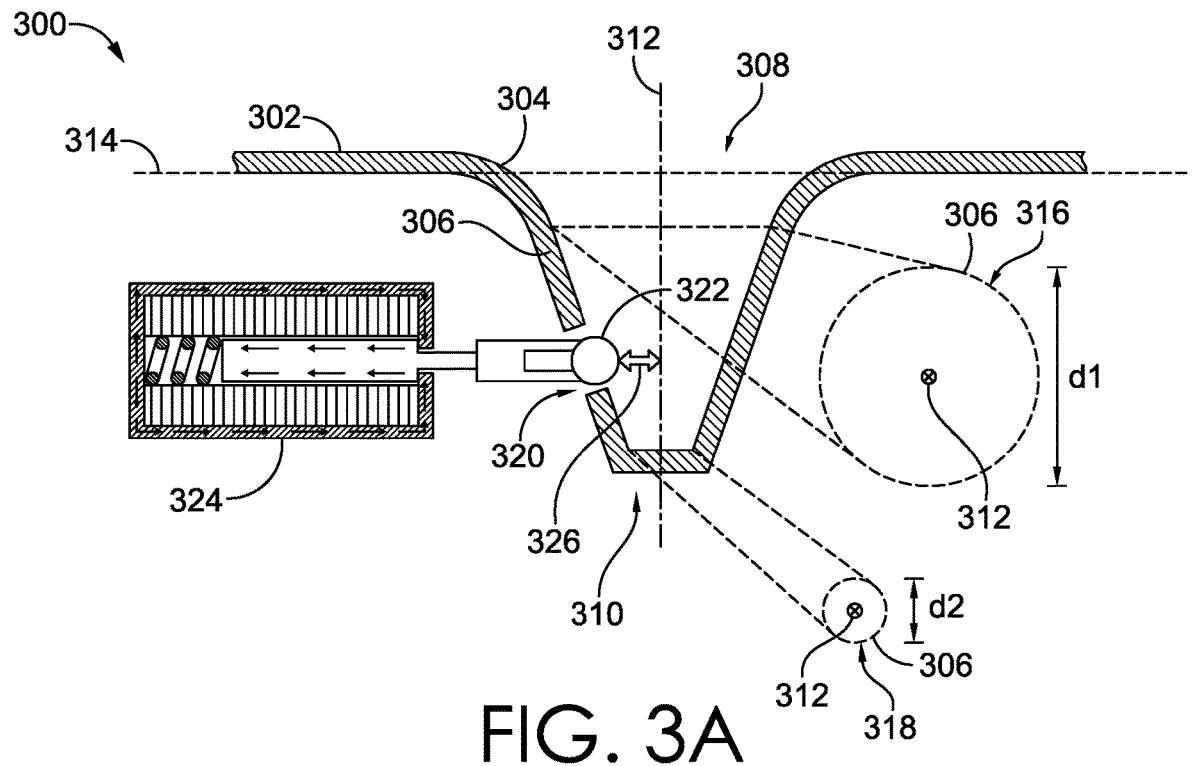
FIGS. 3A-3B illustrate a cross section of an example landing gear receiving site, in accordance with an aspect described herein.
Figure 3B:
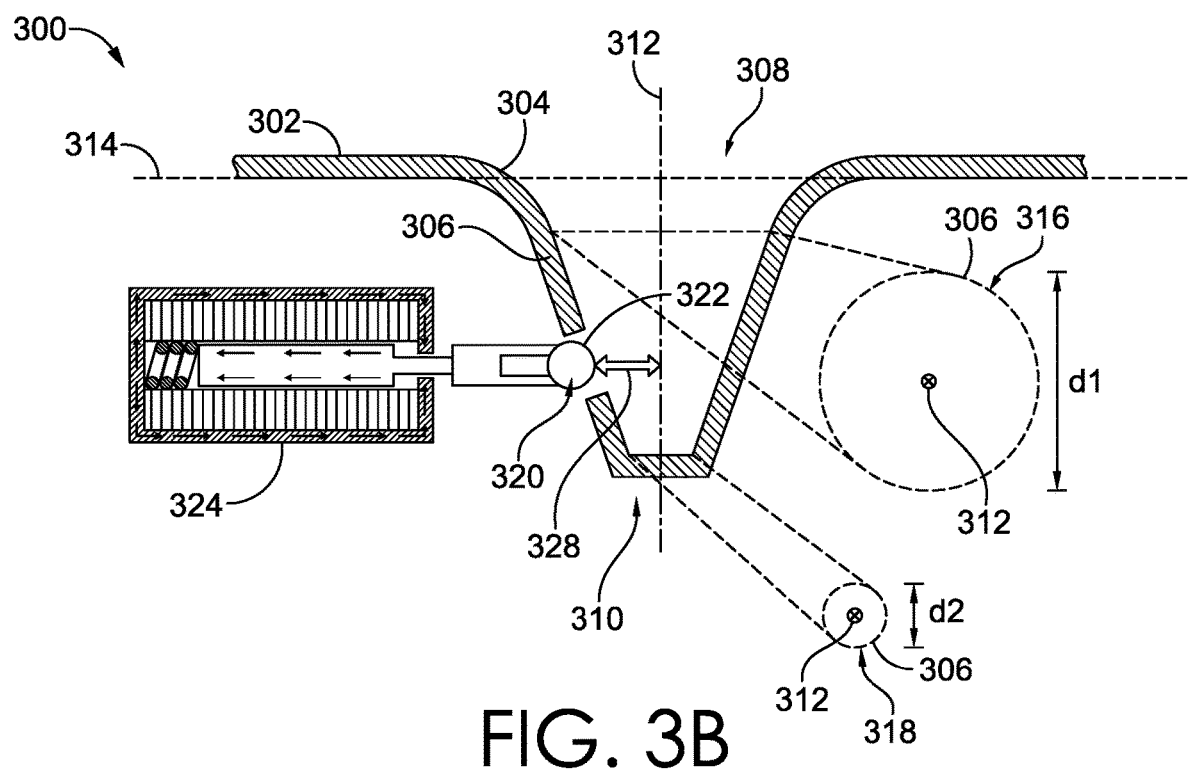

Referring now to FIG. 3A and FIG. 3B, generally, a cross section of landing gear receiving site 300 is illustrated. Landing gear receiving site 300 is one example that is suitable for use with aspects of the technology, such as those provided by FIGS. 1-2. For instance, landing gear receiving site 300 is suitable for use as any of landing gear receiving sites 204a-204c of FIG. 2.

Continuing with FIGS. 3A-3B, landing gear receiving site 300 comprises an opening within landing surface 302. The opening may be defined by perimeter edge 304. At least a portion of perimeter edge 304 may be formed from landing surface 302.

Landing gear receiving site 300 further comprises perimeter wall 306. Perimeter wall 306 extends in a direction away from perimeter edge 304 at first landing gear receiving site end 308 toward second landing gear receiving site end 310 that is opposite first landing gear receiving site end 308. Perimeter wall 306 further at least partially extends around center aspect 312, illustrated as a dotted line, that theoretically extends in a direction between first landing gear receiving site end 308 and second landing gear receiving site end 310.

The example described here, and those throughout this disclosure, is at least partially conical in nature, and as such, the aspect illustrated and provided herein is described with that in mind. However, it should be understood that other designs, such as those that are polygonal in nature, or those that have a variable profile throughout their section as described below, may be suitable for use. As such, the language referencing specific geometric configurations is meant to be illustrative in nature rather than limiting the technology to one particular geometric configuration.

Landing surface 302 at least partially extends through landing surface plane 314 illustrated by a dashed line. First cross section 316 is taken parallel to landing surface plane 314 at a location between first landing gear receiving site end 308 and second landing gear receiving site end 310. Second cross section 318 is taken parallel to landing surface plane 314 at a location between first landing gear receiving site end 308 and second landing gear receiving site end 310. Second cross section 318 is taken at a location that is closer to second landing gear receiving site end 310 relative to first cross section 316. In this particular example of landing gear receiving site 300, a first diameter (d1) of perimeter wall 306 at first cross section 316 is greater than a second diameter (d2) of perimeter wall 306 at second cross section 318. Here, the first diameter (d1) is greater than the second diameter (d2). This configuration is such that a conical landing gear portion, such as those previously described can engage with landing gear receiving site 300 by being inserted within an area formed by perimeter wall 306, and that the conical portion of the landing gear will be moved into a particular position as it comes to rest within landing gear receiving site 300, thereby reducing demand for the associated UAV to make precise flight corrections when landing on landing surface 302. In using this design, a UAV carrying an object can land on landing surface 302 and repeatably come to rest such that the object is aligned with a loading channel of the UAV despite small errors in pose of the UAV when landing.

Landing gear receiving site 300 is also illustrated as comprising lock 320. In general, lock 320 aids in securing landing gear within landing gear receiving site 300, thereby helping to stabilize a UAV on landing surface 302 during movement of a landing system associated with landing surface 302.

In aspects, lock 320 is movable through a portion of perimeter wall 306 between a first position and a second position. The first position is illustrated by FIG. 3A while the second position is illustrated by FIG. 3B. For instance, in the first position, leading edge 322, e.g., an edge of lock 320 nearest to center aspect 312, is separated from center aspect 312 by first distance 326. In the second position, leading edge 322 is separated from center aspect 312 by second distance 328, illustrated in FIG. 3B. In this example, second distance 328 is greater than first distance 326 and allows a portion of the landing gear to be inserted within landing gear receiving site 300.

In one example, lock 320 is moveable between the first position and the second position using an actuator. Actuator 324 is intended to represent an example actuator directly or indirectly coupled to lock 320 to move lock 320 between the first position and the second position. Several types of actuators are suitable and may be used in aspects of the technology, including mechanical actuators, hydraulic actuators, magnetic actuators, electric actuators, and the like. One particular device suitable for use is a linear solenoid. A 19V (volt) 4 A (ampere) linear solenoid is one example, among others, that may be usable, and the solenoid can be communicatively coupled to a controller of an associated landing system to activate the solenoid and move lock 320 between the first position and second position on command. That is, an actuating arm may be coupled directly or indirectly to lock 320, and the actuator is moved between a first actuator position, corresponding to the first position of lock 320, and a second actuator position, corresponding to the second position of lock 320. In aspects, actuator 324 is disposed within a body of a landing system between the landing surface, such as landing surface 302, and a bottom aspect of the landing system.

Lock 320 can be used to facilitate securing landing gear within landing gear receiving site 300. For instance, when the landing gear of a UAV is inserted into landing gear receiving site 300, e.g., the space formed by perimeter wall 306, actuator 324 can move lock 320 into the second position. When the landing gear is positioned such that a groove of the landing gear is proximate lock 320, actuator 324 moves lock 320 back to the first position where it mates with the groove to secure the landing gear of the UAV into place. In some examples, landing gear pushes against lock 320 as it is inserted, moving lock 320 to the second position, and lock 320 moves back to the first position due to a bias on lock 320 toward the first position. Actuator 324 can be activated to disengage lock 320 by moving it from the first position to the second position prior to the UAV taking off from the landing system comprising landing gear receiving site 300.

Figure 4A:
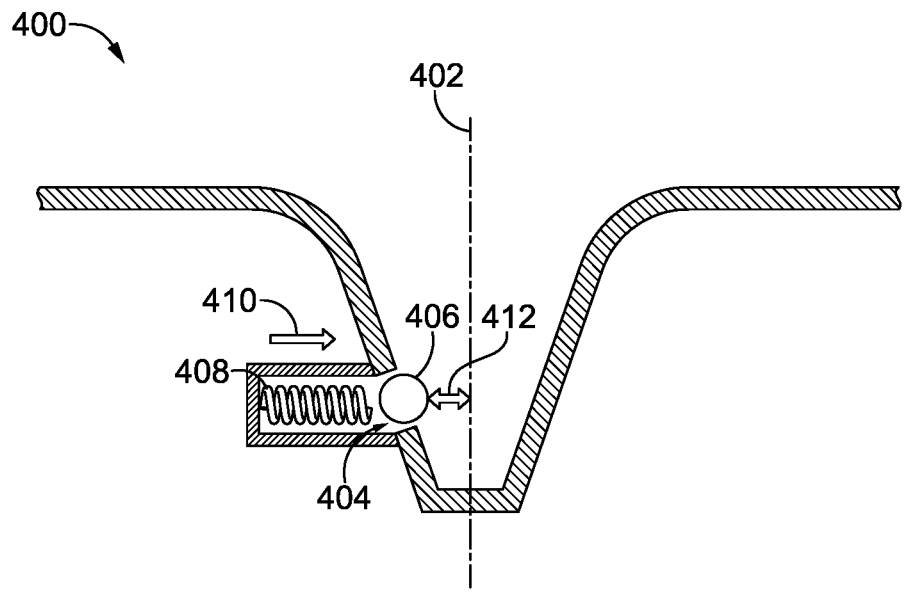
FIGS. 4A-4B illustrate a cross section of another example landing gear receiving site, in accordance with an aspect described herein.
Figure 4B:
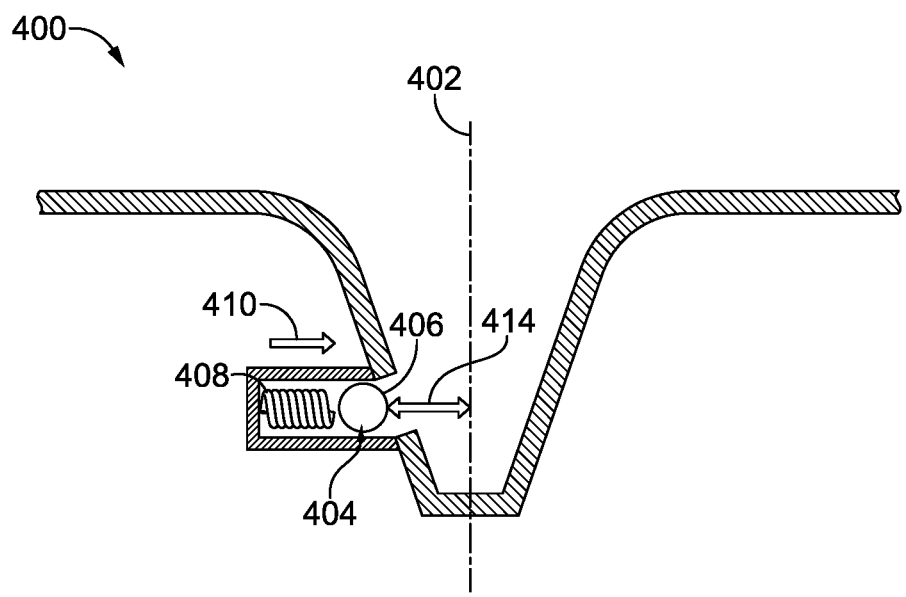

FIGS. 4A-4B generally illustrate yet another example of a suitable landing gear receiving site 400. Here, landing gear receiving site 400 comprises a center aspect 402. Lock 404 is movable between a first position and a second position. In the first position, leading edge 406 is separated from center aspect 402 by first distance 412, illustrated in FIG. 4A. In the second position, leading edge 406 is separated from center aspect 402 by second distance 414, illustrated in FIG. 4B. First distance 412 is less than second distance 414.

In this example, movement of lock 404 between the first position and the second position is facilitated by spring 408. Spring 408 is positioned to place a bias on lock 404 in a direction from the second position to the first position, as represented by arrow 410. When landing gear is inserted within landing gear receiving site 400, the landing gear depresses lock 404 and moves lock 404 from the first position to the second position against the bias. When lock 404 is proximate a groove, lock 404 moves back into the first position due to the bias, thereby mating with the groove and securing the landing gear within landing gear receiving site 400. To release, a UAV can perform a vertical burst, e.g., a quick upward thrust using the rotors. This action allows the landing gear to push lock 404 against the bias and into the second position, and the UAV can then navigate away from the associated landing system.

Figure 5:
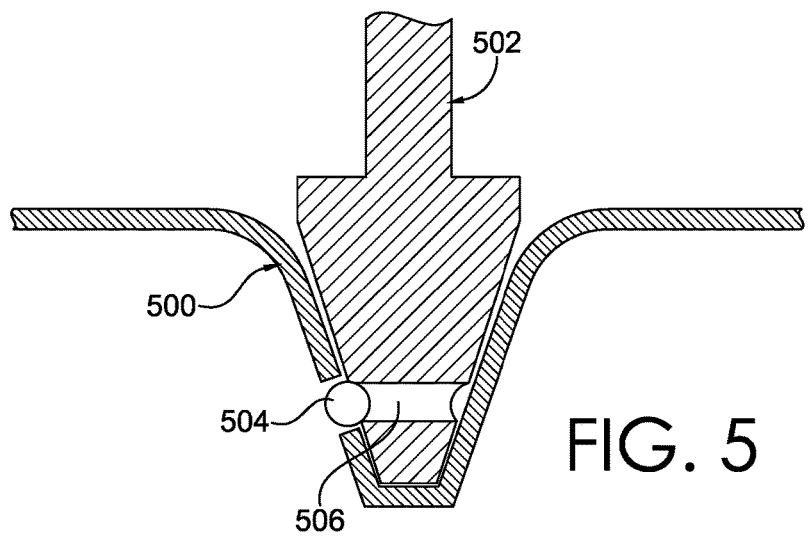
FIG. 5 is a cross section of another example landing gear receiving site having a landing gear secured therein, in accordance with an aspect described herein.

To further illustrate, FIG. 5 provides an example landing gear receiving site 500 comprising an example landing gear 502 inserted and secured therein. Landing gear receiving site 500 is one example that may be suitable as those previously described, such as any of landing gear receiving sites 204a-204c of FIG. 2, landing gear receiving site 300 of FIGS. 3A-3B, or landing gear receiving site 400 of FIGS. 4A-4B.

Here, landing gear 502 has been inserted into landing gear receiving site 500. As a UAV associated with landing gear 502 is landing, the demand for precise aligning movements is reduced, as the opening of landing gear receiving site 500 is wider than the opposite end. As landing gear 502 comes to a rest within landing gear receiving site 500, landing gear 502 is naturally aligned into a particular position based on the shape of landing gear receiving site 500 and the corresponding shape of landing gear 502, thereby allowing for precise positioning of the associated UAV on a landing system without the additional demand for the UAV to precisely navigate to the final position.

Further, landing gear receiving site 500 illustrates landing gear 502 secured within it using lock 504 and groove 506. In this example landing gear 502 has been positioned within landing gear receiving site 500 such that groove 506 is proximate lock 504. In this illustration, lock 504 is the first position in which a leading edge of lock 504 is closer to a center aspect of landing gear receiving site 500 relative to a second position of lock 504. In the first position, lock 504 mates with groove 506, thereby securing landing gear 502 within landing gear receiving site 500. As previously described, actuators, springs, or other mechanisms can be used to facilitate movement of lock 504 between the first position and the second position.

Figure 6:
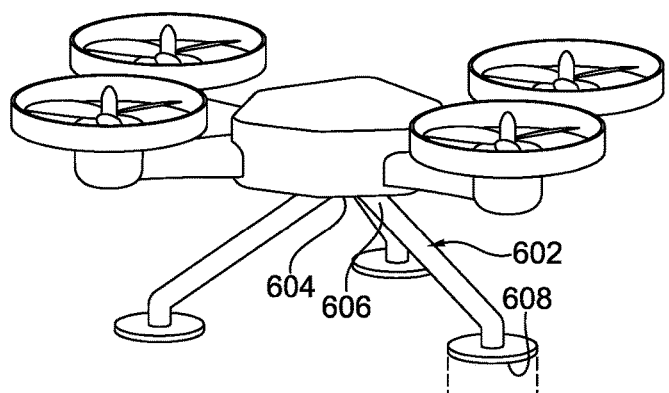
FIG. 6 is another example UAV, in accordance with an aspect described herein.

Referring now to FIG. 6, the figure illustrates UAV 600, which may be any type of UAV having been previously described. In general, UAV 600 is suitable for use with landing system aspects described herein. In particular, UAV 600 is suitable for use with landing systems that will be further described with respect to FIGS. 7-10.

Continuing with reference to FIG. 6, UAV 600 comprises landing gear, an example of which is designated as landing gear 602. In general, landing gear may comprise a plurality of landing gear, such as the three illustrated with respect to UAV 600. Any number of landing gear may be used in providing support and stability during takeoff and landing. In some cases, landing gear also serves other functions, such as acting as an object carrier or any other useful function. As with other embodiments, the specific design of the landing gear may generally vary. In this particular illustration, landing gear 602 is coupled to bottom aspect 604 of UAV 600. Landing gear 602 is coupled to bottom aspect 604 at first landing gear end 606 and extends therefrom to second landing gear end 608.

At second landing gear end 608, landing gear 602 comprises contact area 610, which is generally an area that makes primary contact with a landing surface when UAV 600 is in a landed position. In an aspect, contact area 610 comprises a flat surface that generally contacts a landing surface. In some aspects, contact area 610 comprises a ferrous material. Contact area 610 may also be formed of a relatively light material, such as a synthetic plastic polymer, graphite, and so forth.

Figure 7:
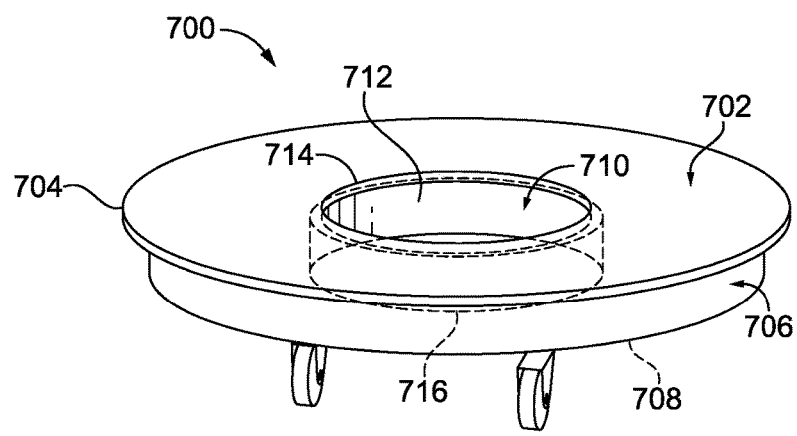
FIG. 7 is another example landing system, in accordance with an aspect described herein.

Turning now to FIG. 7, another example landing system 700 is provided and is suitable for use with aspects of the present technology. In general, landing system 700 can receive a UAV, such as UAV 600 and transport the received UAV. Landing system 700 may receive a UAV at landing surface 702. Landing surface 702 extends across a theoretical plane to outer landing surface edge 704.

Landing surface 702 may be disposed on AGV 706. AGV 706 may be any type of AGV previously described. In general, AGV 706 facilitates movement of landing system 700. As will be further described, AGV 706 may facilitate movement of landing system 700 while a UAV is positioned on landing surface 702. Landing system 700 comprises bottom aspect 708 opposite landing surface 702.

Landing system 700 further comprises loading channel 710. In general, loading channel 710 helps facilitate loading and unloading of objects carried by a UAV, such as UAV 600. Loading channel 710 comprises first loading channel opening 712 that opens at landing surface 702. For instance, first loading channel opening 712 may be defined by perimeter edge 714 that is at least partially formed by landing surface 702. In some cases, perimeter edge 714 may be formed entirely by landing surface 702. In an implementation, landing surface 702 extends between first loading channel opening 712 and outer landing surface edge 704 that defines at least a portion of an outer perimeter of landing surface 702.

Loading channel 710 extends from first loading channel opening 712 through AGV 706 to second loading channel opening 716 at bottom aspect 708. This arrangement allows objects to be released by UAVs and passed through loading channel 710 below landing system 700. When loading, an object can be passed upward through loading channel 710 and secured to a UAV at landing surface 702.

Figure 8:
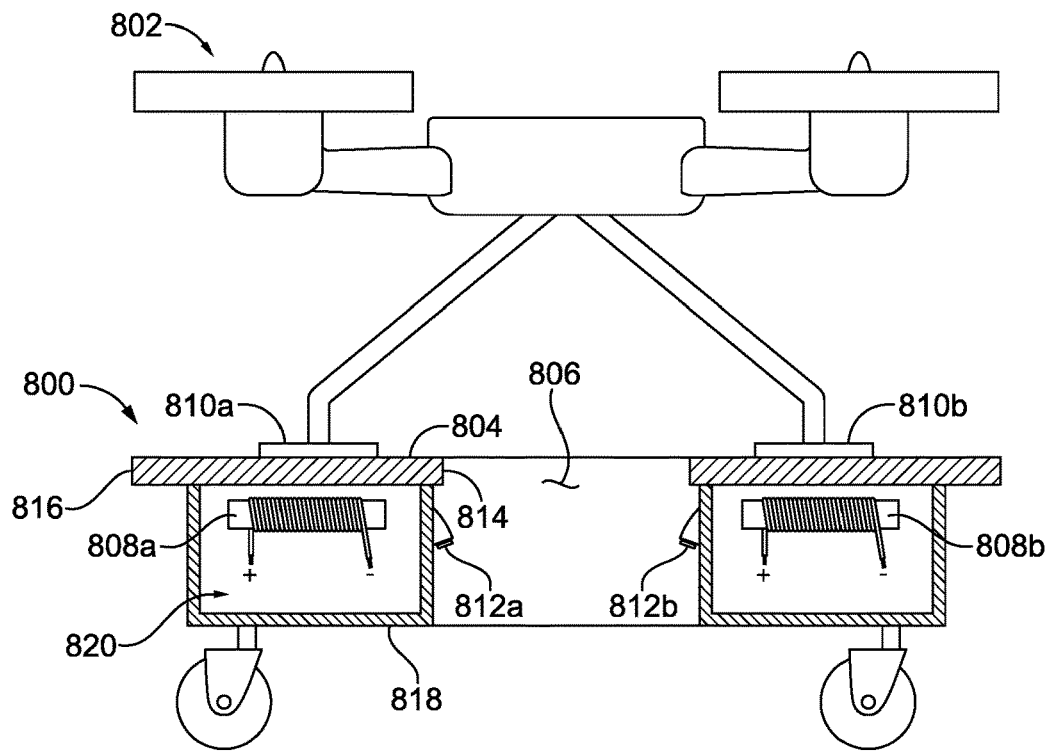
FIG. 8 is a cross section of another example landing system suitable for use as the landing system of FIG. 7, in accordance with an aspect described herein.

FIG. 8 is a cross section of an example landing system 800 used in connection with UAV 802. Landing system 800 is suitable for use as any of the landing systems previously described, such as landing system 700. Landing system 800 comprises landing surface 804 and loading channel 806, which may each comprise features discussed with reference to other landing systems, such as landing system 700.

UAV 802 comprises landing gear having contact areas 810a-810b. Contact area 610 is an example suitable for use as one or more of contact areas 810a-810b. As noted, in a particular example, contact areas 810a-810b comprise a ferrous material.

In the particular example aspect provided by landing system 800, landing system 800 comprises magnets 808a-808b. In general, magnets 808a-808b may be one or more magnets suitable for securing UAV 802 via the ferrous material of contact areas 810a-810b. As such, magnets 808a-808b may be disposed at a location that is between loading channel 806, e.g., between perimeter edge 814 of an opening of loading channel 806 at landing surface 804, and outer landing surface edge 816 of landing surface 804. In aspects, magnets 808a-808b are disposed between the landing surface 804 and bottom aspect 818 of landing system 800.

In an aspect, magnets 808a-808b comprise electromagnets. In general, an electromagnet is operable by an electric current. For instance, an electric current from a battery or other electrical source can be supplied to the electromagnet to activate it under the direction of a controller associated with landing system 800. By activating the electromagnets, a magnetic attraction force is created between magnets 808a-808b and contact areas 810a-810b, thereby securing UAV 802 to landing surface 804 for movement by landing system 800, e.g., using AGV 820.

As further illustrated, landing system 800 comprise one or more cameras 812a-812b. In general, a camera of one or more cameras 812a-812b is positioned such that is has a first field of view of an area proximate bottom aspect 818. In one example, the camera is positioned within loading channel 806. The camera lens can be positioned such that it has a field of view that is outward and away from an opening of loading channel 806 at bottom aspect 818, e.g, a second loading channel opening that is opposite a first loading channel opening at landing surface 804. In another example, a camera may be positioned at a bottom aspect 818. In this way, a camera is positioned such that it has a field of view below landing system 800 toward an area from which UAV 802 receives an object for delivery or releases an object for delivery, e.g., at a target delivery location. As will further be discussed, one or more cameras 812a-812b can be used to input visual information from which the target delivery location is identified for receiving or releasing an object at the target delivery location.

Figure 9:
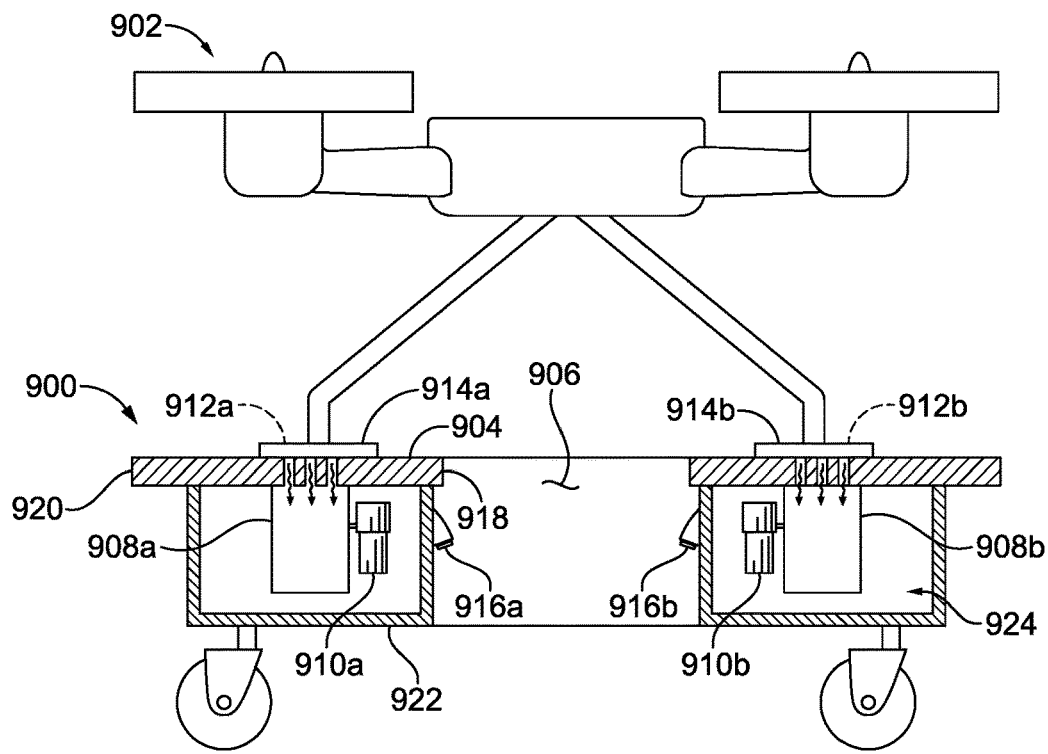
FIG. 9 is a cross section of another example landing system suitable for use as the landing system of FIG. 7, in accordance with an aspect described herein.

Referring now to FIG. 9, the figure illustrates a cross section of another example landing system 900 used in connection with UAV 902. Landing system 900 is suitable for use as any of the landing systems previously described, such as landing system 700. Landing system 900 comprises landing surface 904 and loading channel 906, which may each comprise features discussed with reference to other landing systems, such as landing system 700.

UAV 902 comprises landing gear having contact areas 914a-914b. Contact area 610 is an example suitable for use as one or more of contact areas 914a-914b. As noted, in a particular example, contact areas 810a-810b comprises a polymer, graphite, and so forth, and comprises a flat surface on which contact areas 914a-914b rest when in contact with a landing surface, such as landing surface 904.

To aid in securing UAV 902 to landing surface 904, landing system 900 comprises one or more vacuum chambers 908a-908b and one or more vacuum pumps 910a-910b, in any arrangement. Vacuum chambers 908a-908b comprise open ends 912a-912b that are proximate landing surface 904. While the vacuum system comprising vacuum chambers 908a-908b and vacuum pumps 910a-910b is illustrated having a plurality, aspects of the invention comprise a landing system with one vacuum chamber and one vacuum pump operable to remove air from the vacuum chamber. Any and all such configurations are contemplated and are intended to be within the scope of the disclosure.

As noted, vacuum chambers 908a-908b may comprise open ends 912a-912b. Such open ends 912a-912b may be formed by landing surface 904. In an aspect, landing surface 904 comprises a perforated area at open ends 912a-912b, such that external air can be drawn into vacuum chambers 908a-908b through the perforated areas at landing surface 904. For example, open ends 912a-912b may be positioned at landing surface 904, where landing surface 904 extends between perimeter edge 918 of landing surface 904 at loading channel 906, e.g., a perimeter edge of a first opening of loading channel 906 this is at landing surface 904 and opposite a second opening of loading channel 906 at bottom aspect 922 of landing system 900, and outer landing surface edge 920. As such, open ends 912a-912b may be disposed at a location between perimeter edge 918 and outer landing surface edge 920.

Vacuum pumps 910a-910b are coupled to vacuum chambers 908a-908b, such that vacuum pumps 910a-910b are operable to remove air from within vacuum chambers 908a-908b. For instance, vacuum pumps 910a-910b can be coupled to a controller of landing system 900 suitable for activating vacuum pumps 910a-910b on command. To provide an example, some vacuum pumps suitable for use include 12V to 24V diaphragm pumps.

Such vacuum systems aid in securing UAV 902 to landing surface 904. For instance, vacuum pumps 910a-910b are activated and begin to draw air from vacuum chambers 908a-908b. When contact areas 914a-914b are positioned at open ends 912a-912b, contact areas 914a-914b at least partially seal open ends 912a-912b. This causes the air pressure outside of vacuum chambers 908a-908b to be relatively greater than inside of the vacuum chambers 908a-908b. As a result, UAV 902 is secured to landing surface 904 due to the air pressure difference. As with other embodiments, a UAV can be secured to a landing surface so that the landing system can navigate with the UAV via an AGV, such as AGV 924.

As further illustrated, landing system 900 comprises one or more cameras 916a-916b. The one or more cameras 916a-916b may be mounted similar to those previously discussed with respect to FIG. 8 to help landing system 900 navigate to a target delivery location. The location of cameras 916a-916b is intended to be illustrative and not intended to restrict the disclosure to a particular embodiment.

Figure 10:
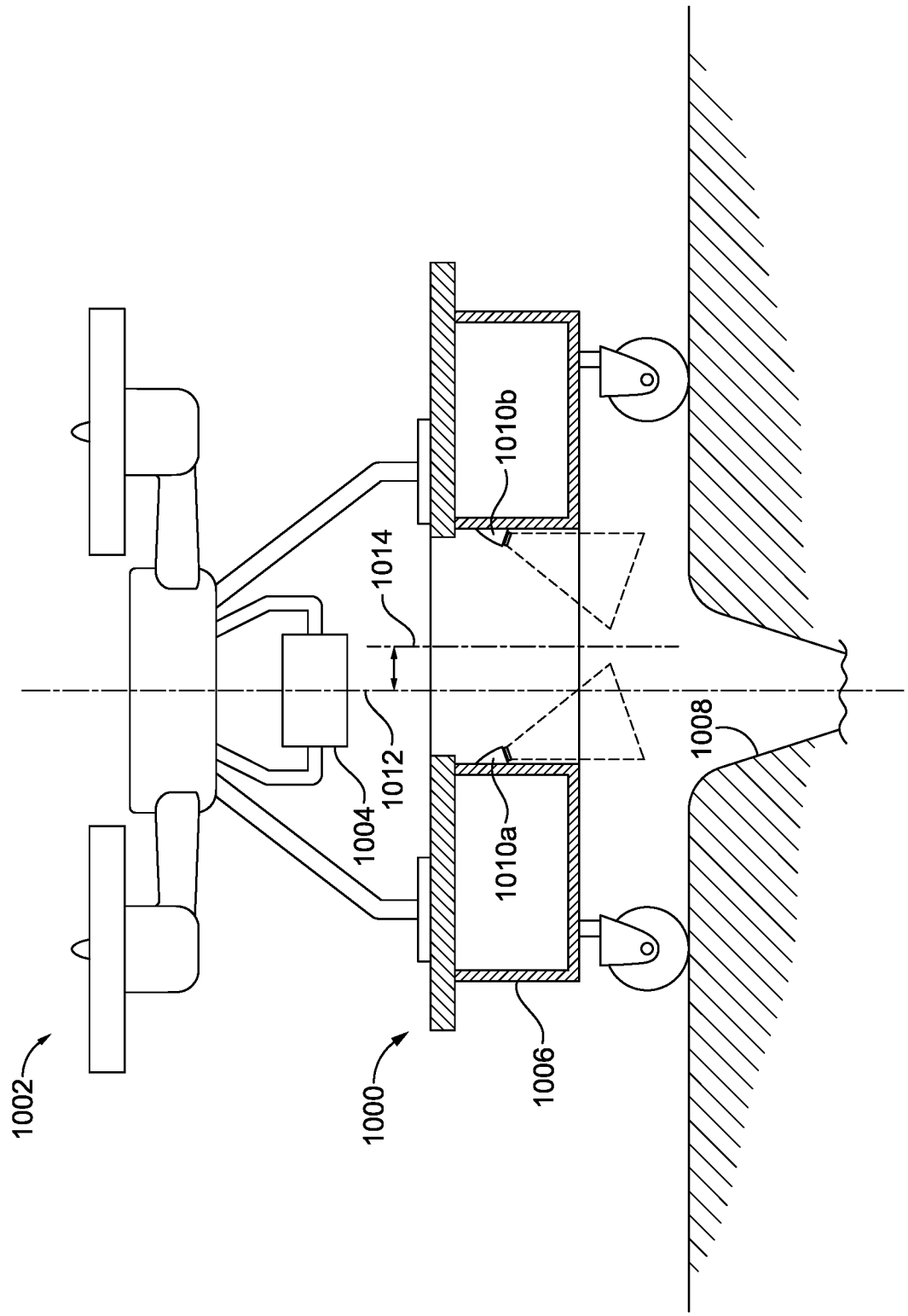
FIG. 10 is a cross section of the landing system of FIG. 7 in operation to facilitate delivery of an object by a UAV to a target delivery location, in accordance with an aspect described herein.

As previously described, landing systems provided herein may receive UAV and navigate UAVs to target delivery locations. At the target delivery location, a UAV retrieves or releases an object for delivery. FIG. 10 illustrates a cross section view of an example landing system 1000 navigating UAV 1002 having object 1004 using AGV 1006 to target delivery location 1008. In general, landing system 1000 is suitable for use as any of the landing systems described herein, such as landing system 200, landing system 700, landing system 800, or landing system 900. Likewise, UAV 1002 is an example suitable for use as any of the UAVs previously described, such as UAV 100, UAV 600, UAV 802, and UAV 902.

In an example aspect, landing system 1000 receives UAV 1002 at a landing surface, and UAV 1002 is secured to the landing surface. For instance, landing gear of UAV 1002 may be secured to the landing surface using a locking system, such as those described with reference to FIGS. 1-5, a magnet, such as the electromagnets described with reference to FIG. 8, the pneumatic systems described with reference to FIG. 9, or another like method.

Having received UAV 1002 at the landing surface, landing system 1000 moves using AGV 1006, which may include any type of AGV provided herein or other like movement device. AGV 1006 is used to navigate UAV 1002 having object 1004 to target delivery location 1008. To do so, AGV 1006 may operate under preprogramed guidance instructions or navigate using a learned model for guidance. For example, cameras 1010a-1010b can receive image information and pass the image information to a learned model configured to identify target delivery location 1008. For instance, a convolutional neural network trained on images of target delivery locations, such as target delivery location 1008, having been labeled to indicate the target delivery locations within the images is one type of learned model suitable for use in identifying target delivery location 1008 and facilitating guidance of AGV 1006 thereto. Additional learned image recognition models may be used to identify objects, such as object 1004. These may also be neural networks trained to identify the objects using labeled images of objects.

AGV 1006 moves landing system 1000 such that object 1004 is aligned with target delivery location 1008. For instance, in some cases, object centerline 1012 may be laterally offset from a vertical landing system centerline 1014, as illustrated in FIG. 10. As such, aligning object 1004 with target delivery location 1008 can include offsetting landing system alignment 1014 from target delivery location 1008 such that object alignment 1012 is aligned with target delivery location 1008. To do so, landing system 1000 may use cameras 1010a-1010b to identify target delivery location 1008 and position landing system 1000 such that object 1004 is aligned with target delivery location 1008.

In some cases, a camera, such as cameras 1010a-1010b also comprises object 1004 or UAV 1002 within a field of view, e.g., also has a field of view of a space above a loading channel of landing system 1000. While reference has been made to cameras that are components of landing systems, it will be understood that other cameras collecting image information and are remote from landing systems may also be used. In one particular example, a UAV received at a landing system comprises a camera, and the camera of the UAV is used to identify the target delivery location and align the object or UAV with the target delivery location for releasing or retrieving an object. In another case, landing system 1000 comprise an upward-facing camera, in the loading channel for example, or another camera positioned so that it has a field of view comprising at least a portion of the space above landing system 1000 proximate the landing surface. Using such cameras, a UAV or object can be identified and its position relative to landing system 1000 and its respective loading channel.

In another aspect not illustrated, landing system 1000 comprises a capacitive sensor disposed at a location proximate the landing surface. One or more capacitive sensors can be disposed within landing system 1000 between an opening to a loading channel and a perimeter edge of the landing surface. The one or more capacitive sensors are positioned around the loading channel. When UAV 1002 lands on the landing surface, the capacitive sensors detect a location of the landing gear based on a change in capacitance determined by the capacitive sensors. In doing so, the alignment from the position of UAV 1002, and thereby the vertical alignment of object 1004, is determined. One example of doing this is to geometrically determine a center vertical aspect of UAV 1000, which may be associated with the vertical alignment of object 1004. For instance, in embodiments where UAV 1002 comprises three landing gear, the location of the landing gear, as determined from the capacitive sensors, forms a geometric triangle from which the center is determined. This can likewise be done for UAVs with any number of landing gear. This vertical alignment of object 1004 can then be compared to the vertical alignment of landing system 1002 to determine the placement of landing system 1000 by AGV 1006 relative to target delivery location 1008. It will be understood that other location-identifying sensors may also be used, such as piezoelectric sensors, induction sensors, and the like, to determine the position of UAV 1002 relative to landing system 1000.

Having navigated to target delivery location 1008, UAV 1002 can release object 1004 so that it passes through a loading channel and to target delivery location 1008. Landing system 1000 determines that object 1004 has passed through a loading channel of landing system 1000. As an example, object 1004 may be identified using a trained model. The object is identified from image information captured by cameras, such as cameras 1010a-1010b. When the object 1004 is identified at target delivery location 1008, it is determined that object 1004 has been released by UAV 1002, and passed through the loading channel of landing system 1000 to target delivery location 1008. In another example, landing system 1000 determines that object 1004 has been released from object 1004 by receiving a communication signal from UAV 1002 or another server indicating the release. Similar methods can be used to determine whether an object has been loaded onto a UAV.

Once object 1004 has been released and is at target delivery location 1008, landing system 1000 is moved away from target delivery location 1008. This can be done using AGV 1006.

In an aspect, UAV 1002, having released object 1004 at target delivery location 1008 or received object 1004 at target delivery location 1008, navigates away from landing system 1000. To do so, landing system 1000 releases UAV 1002. For instance, landing system 1000 may unlock landing gear, deactivate an electromagnet or vacuum pump, or unsecure UAV 1002 using another like method. After landing system 1000 releases UAV 1002, UAV 1002 navigates away from landing system 1000.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Terms, such as "having," "including," or the like, and derivatives thereof, are intended to have the same broad meaning as "comprising," unless otherwise expressly indicated.

The word "accessing," and derivatives thereof, comprises "receiving," "referencing," "retrieving," and the like. Further, the word "communicating" has the same broad meaning as the word "receiving" or "transmitting" facilitated by software or hardware-based buses, receivers, or transmitters using communication media described herein, unless otherwise expressly indicated.

Unless explicitly indicated otherwise, ranges are intended to provide example embodiments that are suitable for some aspects and implementations. They are not intended to exclude other embodiments of the technology having values falling outside of the given ranges.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that can be practiced from the forgoing description include:

Aspect 1: A landing system includes a landing surface. The landing system also includes a plurality of landing gear receiving sites, each landing gear receiving site has an opening formed by the landing surface and a perimeter wall extending away from a perimeter edge of the opening. The perimeter wall extends around a center aspect of the landing gear receiving site. The landing system also includes a lock disposed within each landing gear receiving site, where the lock is movable between a first position and a second position. At the first position, a leading edge of the lock is separated from the center aspect by a first distance.

At the second position, the leading edge of the lock is separated from the center aspect by a second distance. The second distance is greater than the first distance.

Aspect 2: Aspect 1, wherein the lock is biased in a direction from the second position toward the first position.

Aspect 3: Any of aspects 1-2, further comprising a spring, wherein the spring biases the lock in the direction toward the first position.

Aspect 4: Any of aspects 1-3, wherein the lock further comprises an actuator that actuates between a first actuator position and a second actuator position, and wherein the actuator respectively moves the lock between the first position and the second position when actuating between the first actuator position and the second actuator position.

Aspect 5: Aspect 4, wherein the actuator is a linear solenoid.

Aspect 6: Any of aspects 1-5, wherein: the landing surface extends over a landing surface plane and the perimeter wall of each landing gear receiving site extends from a first landing gear receiving site end at the opening to a second landing gear receiving site end; a first cross section of each landing gear receiving site taken parallel to the landing surface plane at the first landing gear receiving site end comprises a first diameter of the perimeter wall; a second cross section of each landing gear receiving site taken parallel to the landing surface plane at the second landing gear receiving site end comprises a second diameter of the perimeter wall; and the first diameter is greater than the second diameter.

Aspect 7: Any of aspects 1-6, further comprising a loading channel, the loading channel comprising a first loading channel opening formed by the landing surface and extending through to a second loading channel opening at a bottom aspect of the landing system that is opposite the landing surface.

Aspect 8: Aspect 7, wherein the landing surface extends between the first loading channel opening and an outer landing surface edge, and wherein the plurality of landing gear receiving sites comprises openings of the landing surface disposed between the first loading channel opening and the outer landing surface edge.

Aspect 9: Any of aspects 1-8, further comprising an autonomous ground vehicle (AGV), the landing surface being disposed on the AGV.

Aspect 10: A landing system includes an autonomous ground vehicle (AGV), a landing surface disposed on the AGV, and a loading channel. The loading channel includes a first loading channel opening formed by the landing surface and extends through to a second loading channel opening at a bottom aspect of the AGV that is opposite the landing surface.

Aspect 11: Aspect 10, further comprising an electromagnet, wherein the landing surface extends between the first loading channel opening and an outer landing surface edge, and wherein the electromagnet is disposed at a location that is between the first loading channel opening and the outer landing surface edge, and between the landing surface and the bottom aspect.

Aspect 12: Any of aspects 10-11, further comprising a vacuum chamber coupled to a vacuum pump operable to remove air within the vacuum chamber, the vacuum chamber comprising an open end proximate the landing surface.

Aspect 13: Aspect 12, wherein the landing surface comprises a perforated area at a location corresponding to the open end of the vacuum chamber.

Aspect 14: Any of as 12-13, wherein the landing surface extends between the first loading channel opening and an outer landing surface edge, and wherein the open end of the vacuum chamber is disposed at a location that is between the first loading channel opening and the outer landing surface edge.

Aspect 15: Any of aspects 10-15, further comprising one or more cameras, the one or more cameras positioned to have a first field of view that is outward and away from at least the second loading channel opening.

Aspect 16: A method of delivering an object from an unmanned aerial vehicle using a landing system includes receiving the UAV carrying the object at the landing system. The landing system includes an autonomous ground vehicle (AGV), a landing surface disposed on the AGV, and a loading channel. The loading channel includes a first loading channel opening formed by the landing surface and extends through to a second loading channel opening at a bottom aspect of the AGV that is opposite the landing surface. The method also includes moving the landing system, via the AGV, such that the object carried by the UAV is aligned with a target delivery location. The method also includes determining that the object carried by the UAV has passed through the loading channel and to the target delivery location. The method also includes subsequent to the object passing to the target delivery location, moving the landing system away from the target delivery location.

Aspect 17: Aspect 16, further comprising determining that object carried by the UAV is aligned with the target delivery location using a camera disposed on the AGV.

Aspect 18: Any of aspects 16-17, wherein the AGV further comprises an electromagnet, and the method further comprises activating the electromagnet, such that activation of the electromagnet secures the UAV to the landing surface.

Aspect 19: Aspect 18, further comprising deactivating the electromagnet subsequent to the object passing to the target delivery location.

Aspect 20: Any of aspects 16-19, wherein the AGV further comprises a vacuum chamber coupled to a vacuum pump, the vacuum chamber comprising an open end proximate the landing surface, and the method further comprises activating the vacuum pump, thereby removing air within the vacuum chamber, such that removing the air within the vacuum chamber secures the UAV to the landing surface.

What is claimed is:

1. A landing system comprising:
   a landing surface;
   a plurality of landing gear receiving sites, wherein each landing gear receiving site of the plurality of landing gear receiving sites comprises an opening formed by the landing surface and a perimeter wall extending from a first landing gear receiving site end at the opening to a second landing gear receiving site end, and a first diameter of the perimeter wall at the first landing gear receiving site end is greater than a second diameter of the perimeter wall at the second landing gear receiving site end to accommodate a contact area of a landing gear that is conical; and
   a lock disposed within each landing gear receiving site of the plurality of landing gear receiving sites, wherein when the contact area of a landing gear is inserted into one of the plurality of landing gear receiving sites and pushes against the lock, the lock is configured such that (i) the contact area depresses and moves the lock from a first position through an opening of the perimeter wall to a second position to allow the contact area to move further into the one of the plurality of landing gear receiving sites and (ii) the lock is biased from the second position through the opening of the perimeter wall to the first position and into a groove of the contact area to lock the landing gear to the landing system once the contact area is inserted into the one of the plurality of landing gear receiving sites such that the groove is aligned with the opening of the perimeter wall.

2. The landing system of claim 1, further comprising a spring, wherein the spring biases the lock.

3. The landing system of claim 1, further comprising a loading channel, the loading channel comprising a first loading channel opening formed by the landing surface and extending through to a second loading channel opening at a bottom aspect of the landing system that is opposite the landing surface.

4. The landing system of claim 3, wherein the landing surface extends between the first loading channel opening and an outer landing surface edge, and wherein the plurality of landing gear receiving sites comprises openings of the landing surface disposed between the first loading channel opening and the outer landing surface edge.

5. The landing system of claim 3, further comprising a camera positioned to have a first field of view that is outward and away from at least the second loading channel opening.

6. The landing system of claim 1, wherein the groove comprises a recessed area that at least partially extends around an axis of the contact area.

7. The landing system of claim 1, wherein the contact area comprises a first cross section and a second cross section, the first cross section having a first width greater than a second width of the second cross section, and the first cross section being closer to the first landing gear receiving site end relative to the second cross section.

8. The landing system of claim 7, wherein the groove comprises a third cross section having a third width less than the first width and the second width.

9. A landing system comprising:
a landing surface;
a landing gear receiving site having an opening formed by the landing surface and a perimeter wall extending away from a perimeter edge of the opening, wherein the perimeter wall extends from a first landing gear receiving site end at the opening to a second landing gear receiving site end, and a first diameter of the perimeter wall at the first landing gear receiving site end is greater than a second diameter of the perimeter wall at the second landing gear receiving site end to accommodate a contact area of a landing gear that is conical; and
a lock disposed within the landing gear receiving site, the lock movable between a first position and a second position, wherein when the contact area of the landing gear is inserted into the landing gear receiving site and pushes against the lock, the lock is configured such that (i) the contact area depresses and moves the lock from the first position through an opening of the perimeter wall to the second position to allow the contact area to move further into the landing gear receiving site and (ii) the lock is biased from the second position through the opening in the perimeter wall to the first position and into a groove of the contact area to lock the landing gear to the landing system once the contact area is inserted into the landing gear receiving site such that the groove is aligned with the opening in the perimeter wall.

10. The landing system of claim 9, further comprising a loading channel, the loading channel comprising a first loading channel opening formed by the landing surface and extending through to a second loading channel opening at a bottom aspect of the landing system that is opposite the landing surface.

11. The landing system of claim 10, further comprising a camera positioned to have a first field of view that is outward and away from at least the second loading channel opening.

12. The landing system of claim 9, wherein the groove comprises a recessed area that at least partially extends around an axis of the contact area.

13. The landing system of claim 9, wherein the contact area comprises a first cross section and a second cross section, the first cross section having a first width greater than a second width of the second cross section.

14. The landing system of claim 13, wherein the groove comprises a third cross section having a third width less than the first width and the second width.

15. The landing system of claim 1, wherein a first diameter of the perimeter wall at the first landing gear receiving site is greater than a second diameter of the perimeter wall at the second landing gear receiving site to accommodate the contact area of the landing gear that is conical.

* * * * *